Oct. 17, 1933.   G. W. HINTON   1,930,680
CONTAINER
Filed Sept. 18, 1931   2 Sheets-Sheet 2

Witnesses:
Victor Siljander
Frank H. Marks

Inventor
George W. Hinton
By Fisher, Clapp, Soans & Pond,
Attys

Patented Oct. 17, 1933

1,930,680

UNITED STATES PATENT OFFICE 1,930,680

CONTAINER

George W. Hinton, Neenah, Wis., assignor to Menasha Wooden Ware Corporation, Menasha, Wis., a corporation of Wisconsin Application September 18, 1931
Serial No. 563,566

5 Claims. (Cl. 229—39)

My invention relates to containers, and has to do more particularly with containers which are especially adapted for thermally-insulating substances, such as hot and cold food substances and the like, and has a special application in the packing of ice-cream and similar frozen comestibles.

A particular object of my invention is to provide a container of the type referred to having a high heat-insulating efficiency.

Another object of my invention is to provide such a device which will be so designed as to reduce the possibility of convection currents from within the container to the outside thereof and vice versa, and within the container itself, to a minimum.

A further object is to provide such a container which is simple in construction, inexpensive to fabricate, and rugged.

Various other objects and advantages will become apparent as the description proceeds.

Referring now to the drawings forming part of this specification and illustrating a preferred embodiment of my invention—

Figure 4:
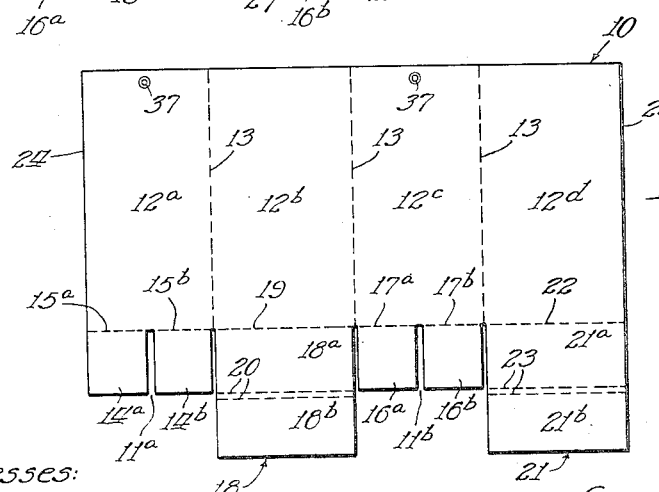
Fig. 4 is a developed view of the outer shell of the container or blank forming the same.

The numeral 10 indicates the outer shell of the container, which may be formed of a blank substantially as shown in Figure 4 and which is preferably formed of corrugated paper-board or like material having relatively thin flat sheets of paper pasted on opposite sides thereof, this material having low heat-transmitting properties and having a plurality of substantially parallel elongated dead-air spaces or cells therein. This shell 10 consists of side wall portions $12^a$, $12^b$, $12^c$ and $12^d$ separated by weakened or scored lines 13 along which the sides of the blank may be folded. It will be noted that the side $12^a$ is provided with a pair of tongues $14^a$ and $14^b$ extending from the bottom portion thereof in continuation of the side $12^a$, these tongues being separated by a relatively narrow slot $11^a$ extending across the width of the tongues $14^a$ and $14^b$. Weakened lines $15^a$ and $15^b$ are disposed, respectively, between the tongues $14^a$ and $14^b$ and the side portion $12^a$ so as to permit bending of the tongues away from the plane of the side.

The side $12^c$ is similarly provided with tongues $16^a$ and $16^b$ which are likewise bendable out of the plane of the side portion $12^c$ by means of weakened lines $17^a$ and $17^b$. These tongues are also separated from each other by means of a relatively narrow slot $11^b$.

The side $12^b$ has formed in continuation of the lower portion thereof a flap 18 which is bendable out of the plane of the side portion $12^b$ by means of a weakened line 19. This flap 18 is provided about midway between the line 19 and its free end with a pair of closely-spaced weakened lines 20 which are substantially parallel to the line 19, whereby the flap may be bent back upon itself so as to form folds $18^a$ and $18^b$.

Similarly, the side $12^d$ has formed in continuation of the lower portion thereof a flap 21 which may be arranged in folds $21^a$ and $21^b$ by reason of the scored or weakened lines 22 and 23.

Figure 3:
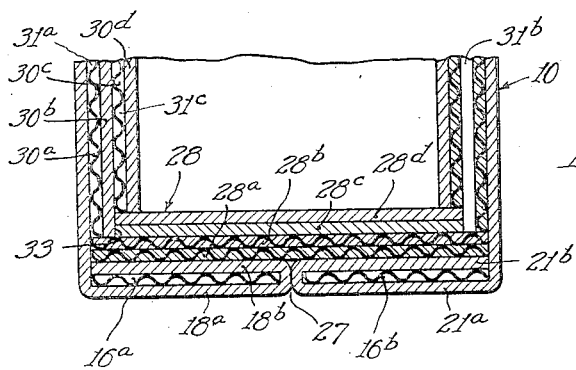
Fig. 3 is a sectional view taken substantially on the line 3—3 of Figure 2.

In constructing the container, the blank is first folded along the weakened or scored lines 13 so as to form a rectangular parallelepiped, the free marginal edges 24 and 25 thereof being secured together down to the weakened lines $15^a$ and 22 by means of adhesive tape 26 or other suitable material. The tongues $14^a$ and $14^b$ are then bent inwardly along the weakened lines $15^a$ and $15^b$ substantially to a position at right angles to the side portion $12^a$ and the tongues $16^a$ and $16^b$ are similarly bent to a position in substantially the same plane with the tongues $14^a$ and $14^b$. Obviously, this will bring the slots $11^a$ and $11^b$ substantially into registry with each other. The flap 18 is then bent along the weakened line 19 to an angle of about ninety degrees, further bent along the lines 20, and then inserted upward into the container through the slots $11^a$ and $11^b$ and bent back upon itself (Figure 3), so that the portion $18^a$ will form substantially one-half of the bottom of the container and the portion $18^b$ will be disposed at an angle of about one hundred and eighty degrees thereto, or in a parallel plane overlying the tongues $14^b$ and $16^a$, as shown clearly in Figure 3. The flap 21 is similarly bent so that the portion $21^a$ will form the other half of the bottom of the container and the portion $21^b$ will be inserted through the slots $11^a$ and $11^b$ and thence bent to a position overlying the tongues $14^a$ and $16^b$ and in substantially the same plane as the portion $18^b$ of the flap 18.

It will be seen from this that the bottom of the container, considering merely the outer shell 10, is formed of three plies of material, and that the corrugations in the alternate plies run perpendicularly to each other. It will also be seen that the flaps 18 and 21 meet each other, as along the fold 27, so as to make a snug juncture, thus reducing the circulation of air into and out of the container at this point to a minimum.

Immediately above the folds $18^b$ and $21^b$ of the bottom, there is disposed an inner base portion, indicated generally at 28. This base is preferably formed of a plurality of plies or laminations $28^a$, $28^b$, $28^c$, and $28^d$ of corrugated paper-board, in the instance shown, four plies being used. It will be noted from Figure 3 that the corrugations of the two lower plies $28^a$ and $28^b$ are arranged in parallel relation and that the corrugations of the two upper layers $28^c$ and $28^d$ are also parallel to each other and at right angles to the corrugations of the lower plies. Also, the two lower laminations have their outer margin fitting snugly against the inner wall of the shell 10, while the two upper plies are marginally indented on all sides. These plies may be secured together by suitable adhesive.

Figure 1:
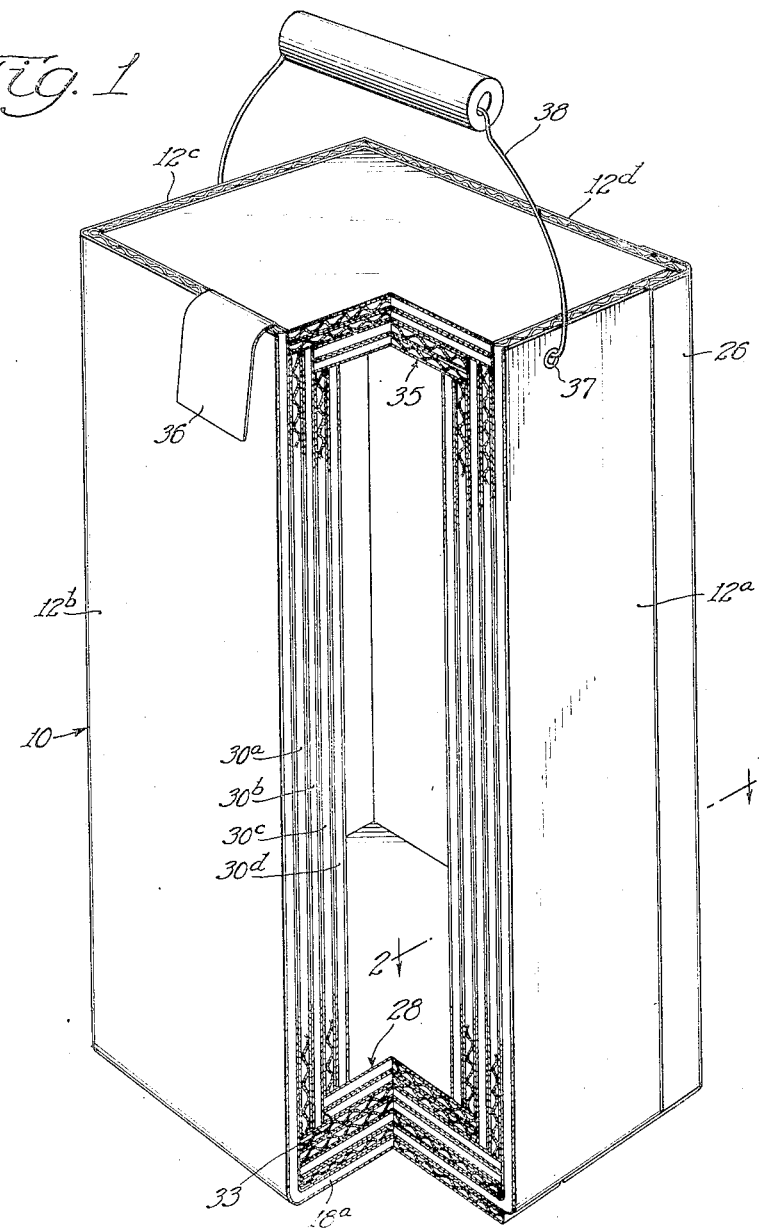
Fig. 1 is a perspective view of a container embodying my invention, a portion thereof being cut away so as to show more clearly the interior construction.
Figure 2:
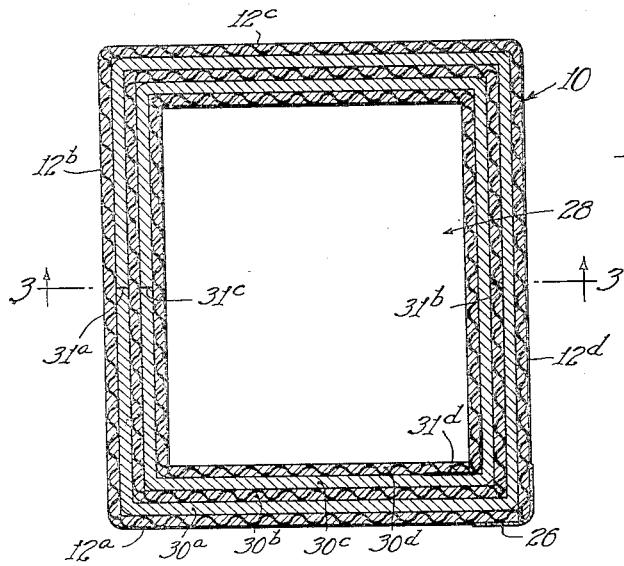
Fig. 2 is a transverse sectional view taken substantially on the line 2—2 of Figure 1.

Referring now particularly to Figures 1 and 2, it will be noted that I build up the thickness of the side walls of the container by means of filler members $30^a$, $30^b$, $30^c$ and $30^d$. These filler members are also preferably formed of corrugated paper-board and are originally cut in rectangular form and then folded on weakened lines in such a way that their side marginal edges will meet, as indicated at $31^a$, $31^b$, $31^c$ and $31^d$, so that the meeting lines of no two adjacent filler members will be in registry. The edges of the innermost filler member $30^d$ are preferably secured together at $31^d$ by adhesive paper or the like so as to make a tight joint at this point. It will also be noted that the lower edges of the filler members $30^c$ and $30^d$ are spaced sufficiently from the lower edges of the filler members $30^a$ and $30^b$ so as to provide a rectangular groove 33 which snugly seats the two upper plies of the base 28, the lower edges of the filler members $30^a$ and $30^b$ resting upon the two lower plies of the base member 28. Similarly, it will be noted from Figure 1 that the filler members $30^c$ and $30^d$ terminate short of the filler members $30^a$ and $30^b$ at their upper extremities so as to form a rectangular groove seating snugly the two lower plies of a cap member 35 which is constructed similarly to the base member 28, the corrugations of the two lower plies of the cap member being disposed at right angles to the corrugations of the two upper plies thereof. The cap member 35 is also preferably provided with a flap 36, preferably formed of flexible material such as paper or textile material, this flap being conveniently secured to the cap member as by having one end thereof glued between a pair of adjacent plies of the cap member, and arranged to extend outside the container as shown in Figure 1, whereby the cap member may be readily removed by grasping the flap 36 and exerting an upward force thereto.

Any two opposite side-wall portions of the outer shell of the container, such as the sides $12^a$ and $12^c$, are preferably apertured adjacent their upper edges, as at 37, these apertures being preferably reinforced by metal eyelets for the insertion of a suitable bail or handle 38.

It will be noted that in the structure described above the possibility of the passage of heat into or out of the container is reduced to a minimum. The material of the container, for one thing, is a poor conductor of heat. As for passage of heat into or out of the container by convection, this is prevented to a large extent by reason of the fact that the corrugated walls of the container are arranged in staggered relation with regard to their corrugations. Thus, it will be noted that the adjacent side walls have their corrugations arranged at right angles to each other and that the cap portion 35 and inner base portion 28 have the corrugations of the outer and inner plies, respectively, arranged at right angles to each other. The same is accomplished with reference to the bottom formed by the plies $18^a$, $16^a$ and $18^b$ and $21^a$, $16^b$ and $21^b$ of the outer shell 10, these flaps also being arranged so that the corrugations of adjacent laminations are at right angles to each other. The effect of this arrangement is to discourage the flow of air currents which might pass through the thin paper membranes separating the various laminations by the creation of tortuous paths from the inside to the outside of the container, with the membranes disposed in such paths. Furthermore, the stepped pyramidal arrangement of the plies forming the base portion 28 and cap portion 35 reduces the possibility of convection currents flowing through the crevices between the side and top walls and between the side and bottom walls by creating a tortuous path for the passage of such currents.

Various modifications, variations and improvements coming within the scope of my invention will doubtless occur to those skilled in the art. Hence, I do not wish to be limited to the precise form shown or uses mentioned, except to the extent indicated by the appended claims, which are to be interpreted as broadly as the state of the art will permit.

I claim as my invention:

1. In a container, a plurality of side-wall portions, two opposite sides each having a pair of tongues hinged thereto, the tongues of each pair being separated by a slot, the other two sides each having a flap hinged thereto, said tongues being folded to lie in a plane substantially perpendicular to the sides with said slots in registry with each other, and said flaps being threaded through said slots so as to be closely contiguous to each other adjacent said slots and thence folded back toward the sides to which said flaps are hinged, said flaps being of such length as to constitute a double floor for said container and said tongues constituting a third floor therebetween.

2. In a container, a plurality of side-wall portions, two opposite sides each having a pair of tongues hinged thereto, the tongues of each pair being separated by a slot, the other two sides each having a flap hinged thereto, said tongues being folded to lie in a plane substantially perpendicular to the sides with said slots in registry with each other, and said flaps being threaded through said slots so as to be closely contiguous to each other adjacent said slots and thence folded back toward the sides to which said flaps are hinged, said flaps being of such length as to constitute a double floor for said container and said tongues constituting a third floor therebetween, said container being formed from a single sheet of heat-insulating material having substantially parallel corrugations formed therein.

3. In a container, a plurality of side-wall portions, two opposite sides each having a pair of tongues hinged thereto, the tongues of each pair being separated by a slot, the other two sides each having a flap hinged thereto, said tongues being folded to lie in a plane substantially perpendicular to the sides with said slots in registry with each other, and said flaps being threaded through said slots so as to be closely contiguous to each other adjacent said slots and thence folded back within the container toward the sides to which said flaps are hinged, said flaps being of such length as to constitute a double floor for said container and said tongues constituting a third floor therebetween, said container being formed from a single sheet of heat-insulating material having substantially parallel corrugations formed therein.

4. In combination with a container as defined in claim 3, an inner base member, a side wall filler, and a top closure member, said filler, base portion, and closure member all being formed of insulating material and so joined as to provide a narrow, tortuous path for convection currents moving into or out of said container.

5. In combination with a container as defined in claim 3, an inner base portion, a side wall filler, and a top closure member, said filler and said base and closure members being formed of a plurality of plies of material similar to that of said container, the edges of the respective plies of said filler being disposed out of registry with those of adjacent plies and the junctures between the plies of said filler and of said base and closure members being in stepped relation, all so as to provide tortuous paths for convection currents into and out of said container.

GEORGE W. HINTON.